US010098377B2

(12) United States Patent
Duan et al.

(10) Patent No.: US 10,098,377 B2
(45) Date of Patent: Oct. 16, 2018

(54) PROCESS AND APPARATUS FOR IMPROVING RAW TOBACCO

(71) Applicant: Shanghai Juhua Science and Technology Co., Ltd., Shanghai (CN)

(72) Inventors: Huang Duan, Shanghai (CN); Xuesong Pan, Shanghai (CN); Bin Liu, Shanghai (CN); Jian Chen, Shanghai (CN); Hongming Wang, Shanghai (CN)

(73) Assignee: Shanghai Juhua Science and Technology Co., Ltd., Shanghai (CN)

( * ) Notice: Subject to any disclaimer, the term of this patent is extended or adjusted under 35 U.S.C. 154(b) by 122 days.

(21) Appl. No.: 15/277,664

(22) Filed: Sep. 27, 2016

(65) Prior Publication Data
US 2017/0013871 A1    Jan. 19, 2017

Related U.S. Application Data

(62) Division of application No. 13/984,960, filed as application No. PCT/CN2013/000027 on Jan. 14, 2013, now Pat. No. 9,480,283.

(30) Foreign Application Priority Data

Dec. 20, 2012    (CN) .......................... 2012 1 0556163

(51) Int. Cl.
*A24B 15/26* (2006.01)
*B01D 61/14* (2006.01)
(Continued)

(52) U.S. Cl.
CPC ............. *A24B 15/26* (2013.01); *A24B 3/04* (2013.01); *B01D 61/027* (2013.01); *B01D 61/08* (2013.01);
(Continued)

(58) Field of Classification Search
None
See application file for complete search history.

(56) References Cited

U.S. PATENT DOCUMENTS

| 4,898,188 A | 2/1990 | Niven, Jr. et al. |
| 4,941,484 A * | 7/1990 | Clapp .................... A24B 15/20 131/297 |

(Continued)

FOREIGN PATENT DOCUMENTS

| CN | 1029724 C | 9/1995 |
| CN | 1739411 | 3/2006 |

(Continued)

*Primary Examiner* — Dennis R Cordray
(74) *Attorney, Agent, or Firm* — Sand & Sebolt

(57) ABSTRACT

Disclosed are a process and an apparatus for improving tobacco raw material. The process mainly comprises performing an extraction from at least one of tobacco leafs, tobacco flakes, tobacco powder, stalks and cut stems by mixed solvents, conducting a solid-liquid separation for the tobacco raw material, applying the extract liquor of tobacco leaves, flakes and cuts for manufacturing tobacco extract and that of stalks and cut stems for manufacturing fertilizer, diluting and mixing a given amount of tobacco aqueous extract and ethanol extract and removing harmful components so as to get feed liquid, backfilling the feed liquid to the tobacco raw material, and drying the tobacco raw material to a certain dryness to obtain the products. The apparatus is a system composed of a plurality of interconnected independent devices such as extractor, solid-liquid separator, a feed liquid backfiller, etc.

13 Claims, 2 Drawing Sheets

(51) Int. Cl.
*B01D 61/18* (2006.01)
*B01D 61/02* (2006.01)
*A24B 3/04* (2006.01)
*B01D 61/08* (2006.01)

(52) U.S. Cl.
CPC .......... *B01D 61/145* (2013.01); *B01D 61/18* (2013.01); *B01D 2311/06* (2013.01)

(56) References Cited

U.S. PATENT DOCUMENTS

| | | |
|---|---|---|
| 5,131,414 A | 7/1992 | Fagg |
| 5,143,097 A | 9/1992 | Sohn et al. |
| 5,234,008 A | 8/1993 | Fagg |
| 5,601,097 A | 2/1997 | De Grandpre et al. |
| 6,298,859 B1 | 10/2001 | Kierulff et al. |
| 6,679,270 B2 | 1/2004 | Baskevitch et al. |
| 7,954,498 B2 | 6/2011 | Ott et al. |
| 8,007,637 B2 | 8/2011 | Liu et al. |
| 9,049,886 B2 | 6/2015 | Zimmermann |
| 2011/0155152 A1 | 6/2011 | Harris et al. |

FOREIGN PATENT DOCUMENTS

| | | |
|---|---|---|
| CN | 101204249 B | 5/2012 |
| CN | 102440433 | 5/2012 |
| CN | 102599639 | 7/2012 |
| EP | D443761 | 8/1991 |
| GB | 986953 | 3/1965 |
| JP | 2009504166 | 2/2009 |
| WO | 02/28209 | 4/2002 |
| WO | 2005/004646 | 1/2005 |
| WO | 2007/032433 | 3/2007 |
| WO | 2009/150444 | 12/2009 |

\* cited by examiner

PROCESS AND APPARATUS FOR IMPROVING RAW TOBACCO

CROSS-REFERENCE TO RELATED APPLICATIONS

This is a Divisional of U.S. patent application Ser. No. 13/984,960 filed Aug. 12, 2013 which is a National Entry of PCT/CN2013/000027 having an international filing date of Jan. 14, 2013, which PCT application claims priority from CN 201210556163.9 filed on Dec. 20, 2012. The entire disclosure of U.S. patent application Ser. No. 13/984,960 is incorporated herein by reference.

FIELD OF THE INVENTION

The present invention relates to a method of processing tobacco raw material and an apparatus therefor, and particularly to a process and apparatus for improving the tobacco raw material while maintaining original form thereof, which are adaptive for improving form, quality and color of the tobacco raw material.

BACKGROUND OF THE INVENTION

Cigarette is a small paper cylinder filled with dried and finely cut tobacco leaves therein for smoking. At present, the natural tobacco raw material directly used in cigarette industry includes raw stuff produced by tobacco leaves and stalk, for which corresponding large manufacturing equipments are provided.

It is known that natural tobacco raw material contains nicotine and nitrosamine and will generate tar and carbon monoxide during its burning, which are harmful to human's health. The smoking flavor is significantly affected by various factors such as variety, planting area, cultivating method, remained leaves number, maturity and aging, etc. The heavy wooden smell and the bitter, hot, and harsh taste brought about by the cut stem filled in the cigarette also restrict the development of the tobacco industry. It is a very important and long term researching subject for cigarette industry to decrease the harmful components, to improve smoke flavor of the tobacco raw material and consequently to improve the quality of the tobacco raw material. Recent years, many studies on improvement of tobacco raw material focused on the following aspects.

1. Additional measures taken in the cigarette production.

Aging, moisture regaining, conditioning, cut tobacco drying, expanding of tobacco raw material, etc, which are generally adopted, improve the quality of tobacco raw material only in certain extent but cannot play a key role on the improvement of tobacco raw material.

2. Addition of reproduced tobacco slice.

Chinese patent No. 93120477.1 disclosed a process and apparatus for manufacturing tobacco slice by papermaking process. By using some leftovers such as waste tobacco leaves, tobacco fines, powder, and stalks as raw material, the process is implemented by the steps of grinding, impurity removal, drying, and extracting effective components by solvent to obtain extract liquor and extraction residues, the extract liquor being concentrated, separated from harmful components, and concentrated into extract to get the coating liquid, and the extraction residues being pulped, added with outer fiber, paper made into base paper, then coating the coating liquid on the base paper, drying and finally obtaining reproduced tobacco slice. The natural tobacco raw material directly used in cigarette industry generally maintains the original material without grinding and reproduction. The reproduced tobacco slice as a raw material is added into the natural tobacco raw material directly used in cigarette industry with a proportion being generally controlled under 10%, internationally 35% in maximum, in consideration of traditional smoking flavor and quality. Thus, the reproduced tobacco slice can improve tobacco components only in certain extent but not play a key role on the improvement of tobacco raw material. The reproduction of tobacco slice has the advantage of utilization of waste and the disadvantages of complexity, high cost and high addition of non-tobacco substances.

3. Addition of functional additives.

A lot of measures have been adopted to reduce harmfulness of cigarette, such as adding potassium salt for decreasing pyrolysis temperature so as to reduce the CO amount in smoke, and adding specific microorganisms for the degradation of nicotine, nitrite, and tobacco-specific nitrosmaines (TSNAs), etc. However, such additions will be liable to cause unknown safety problems of harmfulness and toxic, and may change the traditional smoking flavor of the cigarette. Improving smoking flavor merely by addition of aroma components is unsatisfactory since the bad flavor is not removed.

4. Washing tobacco (the cut stem made of stalk).

Chinese patent application No. 201010563347.9 discloses a method for reproducing cut stems, which comprises: washing cut stem with prepared basic or acid washing solvent to remove off-flavors components, wherein the washing solvent is discarded or used for other purpose, and subsequently dehydrating to a moisture of 50~90%, immersing the dehydrated cut stem in the feed liquid prepared by 1~10 parts of sugar, 0.01~3 parts of nicotine, 0.1~1 part of potassium, 1~40 parts of aroma components in tobacco, 0.1~5 parts of antistaling agents, 0.1~1 parts of pigment, and 35.71~97.6 parts of water or organic solvent by weight, then dehydrating to a moisture of 50~90%, and finally drying to a dryness that meets the requirement of stem expanding process. The defects of the above technical solution are: 1) the washing solvent with complex composition causes unknown problems affecting smoking safety; 2) there were great differences between the composition of the feed liquid and that of natural tobacco, therefore the smoking flavor of the reproduced cut stem is greatly different from that of natural tobacco; and 3) the lack of recycle measure of washing liquid causes environment pollution.

5. Extraction of tobacco (cut stem of stalk).

Chinese patent application No. 201110265037.3 filed by the present applicant discloses a method of manufacturing tobacco cut stem. In this method, the cut stalk is extracted with solvent through a series of extraction devices at a ratio of mass of material to solvent being 1:20, 20~60 min, solvent temperature of 20~50° C., and extraction mode being downstream. The extract liquor is discarded. After a solid-liquid separation by means of squeezing and centrifugation, the cut stem is backfilled by spraying the feed liquid having a concentration of 30~40% at 20~40° C. and with a proportion of addition at 40~120%. The backfilled cut stem is pretreated to lower down its moisture from about 65% to about 35%, and then is tower puffed or airflow dried so that the taste of cut stem can be improved and the harmful components such as tar and carbon monoxide in cut stem are reduced, which increases the filling value and the utilization of cut stem. The disadvantages of the above technical solutions are: 1) the blending of the backfilling feed liquid is too complicated and expensive, which goes against practical application and production; 2) lack of the recycle measures of the feed liquid will cause environmental problems; and 3) too much addition of non-tobacco substance could easily lead to unknown problems in smoking security.

In conclusion, in the researches and practices for improving tobacco raw material, the waste tobacco leaves in cigarette production as a raw material are grinded and reproduced to obtain tobacco slice which cannot play a key role in the improvement of tobacco raw material due to the limitation of the proportion of addition, and has the disadvantages of complicated process and high cost. The non-tobacco substances of the specific additives in original tobacco raw material will lead to new and unknown safety problems and affect the traditional smoking flavor. Moreover, addition of aroma components solely cannot achieve a satisfactory effect as the bad flavor hasn't been removed. The method, which comprises washing or extracting the original cut stem, removing the undesired extract liquor, and backfilling into the cut stem with prepared feed liquid, is liable to generate new or unknown safety problems as the process is still unmatured. Further, the method still has the disadvantages that the smoking flavor is greatly different from that of natural tobacco, the preparation is too complicated for practical operation, and lack of trecycle measures for the washing liquid and the extract liquor will cause environment pollution.

It is undoubtedly a determinant technical measure to directly improve the tobacco raw material directly used in cigarette industry on the basis of keeping original form of material. However, at present, relevant researches and corresponding practices in this respect are not matured and satisfying. There are still some problems to be solved. The corresponding equipments are also not matured and some aspects are still nearly in blankness.

SUMMARY OF THE INVENTION

The conventional technologies for improving tobacco raw material have drawbacks in their complexity and high cost. Moreover, the additive non-tobacco substance is liable to render new and unknown poisonous and harmful security problems, significantly affects traditional smoking flavor of tobacco, and causes environmental pollution with less improvement of smoking flavor. In order to overcome the drawbacks in the prior art, an object of the present invention is to provide a process and an apparatus for improving tobacco raw material.

According to one aspect of the invention, there is provided a process for improving tobacco raw material by extracting with solvent and processing tobacco raw material used in cigarette industry, removing harmful components, and backfilling with feed liquid, thus obtaining improved tobacco raw material, characterized in that the process comprises the successive steps as follows:

1) mixing more than one of tobacco raw materials selected from tobacco leaves, flakes, cuts tobacco, tobacco powder, stalks, and cut stems with a mixed solvent containing 65~97% of purified water and 3~35% of other solvents at a mass ratio of 1:4~30 between tobacco raw material and the solvent, conducting extraction at a temperature of 10~80° C. for a period of 1~120 min;

2) conducting solid-liquid separation for the tobacco raw material after extraction by means of squeezing or centrifugation until the dryness of tobacco raw material reaches 20~60%;

3) preparing extract of natural tobacco to be used in the process from the extracted liquor after the solid-liquid separation of the tobacco leaves, flakes or cuts, the extracted liquor after the solid-liquid separation of the stalks or the cut stems being used for producing fertilizer but not in the process;

4) preparing the backfilling feed liquid by the following steps: firstly, diluting 1~10 parts by mass of aqueous extract of natural tobacco and 0.1~15 parts by mass of alcohol extract of natural tobacco and mixing the dilution uniformly, secondly, removing harmful components, and lastly, forming the backfilling feed liquid with a concentration controlled at 20~50%;

5) adjusting the dryness of the tobacco raw material after the solid-liquid separation to 40~60%, then backfilling uniformly the backfilling feed liquid to the tobacco raw material after solid-liquid separation by spraying or immersion, with a mass ratio of the backfilling being 10~120%; and 6) drying the tobacco raw material backfilled with the feed liquid until the moisture thereof reaches 11~13% to obtain the end product.

Said harmful components refer to those components detrimental to health or causing bad smoking flavor. The list of the harmful components can be determined according to the specific requirement on the end product.

Said other solvents in step 1) may be one or more solvents selected from ethanol, glycerol, propanediol or any other suitable solvents.

Said solid-liquid separation of the tobacco raw material in step 2) may be implemented by squeezing. The tobacco raw material after squeezing may be further loosened to be in a sufficiently loose state.

Said removing harmful components in step 4) may be implemented by nanofiltration membrane separation, ultrafiltration membrane separation or column separation. The specification of the nanofiltration membrane or the ultrafiltration membrane can be chosen from a cut-off molecular-weight of 3000~100000 Daltons.

Said extraction in step 1) and said solid-liquid separation in step 2) may be preformed once or cycled more than twice.

Said drying in step 6) may be implemented by firstly conducting a pre-drying by microwave until the dryness of the tobacco raw material reaches 60~70%, followed by reducing the moisture to 11~13% by inflation process.

Said aqueous extract of natural tobacco in step 3) may completely adopt the aqueous extract of natural tobacco prepared by the extract liquor in the above mentioned or other process, or a combination of both kinds of aqueous extract.

Said backfilling uniformly the backfilling feed liquid to the tobacco raw material after solid-liquid separation in step 5) may comprise stirring and simultaneously squeezing the tobacco raw material preliminarily mixed with the backfilling feed liquid so that the tobacco raw material uniformly absorbs the backfilling feed liquid, and then loosening the squeezed tobacco raw material to a sufficiently loose state.

Said preparation of the backfilling feed liquid in step 4) may comprise adding humectant or other functional agents allowed to be added in the tobacco products besides purified water and aqueous or alcohol extract from natural tobacco that are not prepared by the extract liquor in the above mentioned process.

Said producing fertilizer using the extract liquor after solid-liquid separation of stalks or cut stems in step 3) may comprise purifying and concentrating the extract liquor, adding microbial agents into said extract liquor to form liquid organic fertilizer after fermentation of the microbial agents. The microbial agent may be any one or a combination of bacteria, actinomycetes, and fungus.

According to another aspect of the invention, there is provided an apparatus for improving tobacco raw material according to the process mentioned above, which is a system composed of a plurality of interconnected independent devices, characterized in that the apparatus comprises: a material room, a solvent room, an extractor, a solid-liquid separator, an extract producer, an extract room, a feed liquid preparing device, a room for collecting harmful substance, a room for distributing additional material, a room for collecting fertilizer raw materials, a moisture content regulator, an feed liquid backfiller and a dryer, wherein an outlet of the material room and a liquid outlet of the solvent room are communicated with an inlet of the extractor, an outlet of the extractor is communicated with an inlet of the solid-liquid separator, a liquid outlet of the solid-liquid separator is communicated at one branch with a liquid inlet of the extract producer and at another branch with the room for collecting fertilizer raw materials, an outlet of the extract producer is communicated with an inlet of the extract room, an outlet of the solid-liquid separator is communicated with an inlet of the moisture content regulator, an outlet of the moisture content regulator is communicated with an inlet of the feed liquid backfiller, an outlet of the extract room is communicated with an inlet of the feed liquid preparing device, the room for distributing additional material is communicated with an inlet of the feed liquid preparing device, a liquid outlet of the feed liquid preparing device is communicated with the liquid inlet of the feed liquid backfiller, a harmful substance outlet of the feed liquid preparing device is communicated with the room for collecting harmful substance, an outlet of the feed liquid backfiller is communicated with an inlet of the dryer, and an outlet of the dryer is communicated with a product room.

Said independent devices may further comprise a secondary material room. The outlet of the solid-liquid separator is communicated at one branch with an inlet of the secondary material room and at another branch with an inlet of the moisture content regulator, the outlet of the secondary material room is communicated with the inlet of the extractor. This arrangement is designed to satisfy the need that the steps of extraction and solid-liquid separation are cycled more than twice.

All of the connection portion between said one independent device and another independent device is provided, where necessary, with a conveyer belt, a spiral propeller, an infusion pump, a delivery pipe, a detector or a delivery metering controller, etc.

The solid-liquid separator, at the liquid outlet connecting to the liquid inlet of the extract producer, and at the liquid outlet connecting to the liquid outlet of the room for collecting fertilizer raw materials, are respectively provided with a switch which is controlled on and off according to the specific tobacco raw material and process.

Said solid-liquid separator may adopt a centrifugal or a squeezing dryer.

The feed liquid preparing device may be provided with a nanofiltration membrane separator, an ultrafiltration membrane separator or a column separator for the separation of the harmful components.

The feed liquid backfiller may be provided with a stirring mechanism or a squeezing mechanism.

Where the solid-liquid separator adopts squeezing dryer, or the feed liquid backfiller is provided with squeezing mechanism, the solid-liquid separator or the feed liquid backfiller may be provided, at the connection portion of the outlet thereof, with a scattering means for loosening processing.

The moisture content regulator may be a heating evaporator or a humidifier, etc.

The room for distributing additional material may be a metering distribution system for various additional materials.

The inventions are advantageous in that:

1. The effective components of tobacco raw material are extracted while the original form of the material is kept, and the effective components of tobacco raw material is reformed through backfilling of the feed liquid, which allows removing the bad flavor and decreasing harmful components, avoiding the complicated procedure of making paper base, reducing the cost of manufacturing and improving the tobacco raw material;

2. Specific mixed solvents are used for the extraction, which is advantageous for taking the optimal configuration of the devices of the process and a more complete extraction of the effective components.

3. The ethanol extract or water extract from natural tobacco are used for preparing the backfilling feed liquid, which significantly simplifies the process of mixing the backfilling feed liquid and the manufacturing process thereof, and avoids complexity, difficult operation and high cost of manufacture caused by using various single raw material to blend the feed liquid.

4. The improved products of tobacco leaves, flakes, cuts, stalks and cut stems of which original forms and properties are maintained can be directly used in the production equipment of cigarette industry without changing the traditional flavor of products to consumers.

5. Addition of non-tobacco substances is very little, which greatly reduces the possibility of rendering new harmful or toxic factors, and maintains the traditional smoking flavor of tobacco.

6. Advantageous applications are found for the extract liquor that is not used in the process, thereby avoiding pollution caused by the discharge of the liquor.

7. The process is relatively matured, the equipment sets is complete, and the production process has a wide application.

8. A large amount of the product obtained by the invention can be added in, or even replaces the natural tobacco raw material directly used in the cigarette industry, which can significantly improve the tobacco products.

The present invention will now be described in detail by referring to the accompanying drawings that illustrate the embodiments of the invention.

DETAILED DESCRIPTION OF EMBODIMENTS

Embodiment 1

A process for improving tobacco raw material according to an embodiment of the invention comprises conducting extraction from tobacco raw material used in cigarette industry by solvent, removing harmful components and backfilling with the feed liquid to obtain the improved tobacco raw material. The process specifically comprises the following steps:

1) Mixing stalks or cut stems (tobacco raw material) with a mixed solvent containing 65% of purified water and 35% of ethanol at a mass ratio of 1:6 (tobacco raw material: solvent), and then conduct an extraction at a temperature of 80° C. for 1 minute;

2) Conducting a solid-liquid separation for the tobacco raw material after extraction by means of squeezing until the dryness of tobacco raw material reaches 20%;

3) Loosening the tobacco raw material after solid-liquid separation to a sufficiently loose status, with the extract liquor after solid-liquid separation being used for manufacturing fertilizer but not in this process;

4) Preparing a backfilling feed liquid by the following steps: firstly, diluting by purified water 10 parts by mass of aqueous extract of natural tobacco and 15 parts by mass of alcohol extract of natural tobacco which are prepared by other extract liquor than in the present process, and mixing them uniformly, then removing the harmful components by nanofiltration membrane with a cut-off molecular-weight of 2000 Dalton, and subsequently adding humectant or other functional agents allowed to be added in the tobacco production so as to obtain the backfilling feed liquid with a concentration thereof being controlled by 50%;

5) Adjusting the dryness of the tobacco raw material after solid-liquid separation to 40%, spraying uniformly and backfilling the backfilling feed liquid to the tobacco raw material after solid-liquid separation with a backfilling mass ratio of 10%, stirring the tobacco raw material and simultaneously squeezing them so as to have the tobacco raw material uniformly absorb the backfilling feed liquid, and then loosening the tobacco raw material;

6) Pre-drying by microwave the tobacco raw material after the backfilling until the dryness of the tobacco raw material reaches 70%, followed by reducing the moisture to 11% in an inflation process, thus obtaining the end products.

The extraction operation in step 1) and the solid-liquid separation in step 2) are cycled twice before going to step 3).

In step 3), using the extract liquor after solid-liquid separation of stalks or cut stems for manufacturing fertilizer comprises purifying and concentrating the extract liquor, adding therein one or several kinds of microbial agent such as bacteria, actinomycetes, fungus to ferment them in the extract liquor to obtain liquid organic fertilizer after fermentation.

Figure 1:
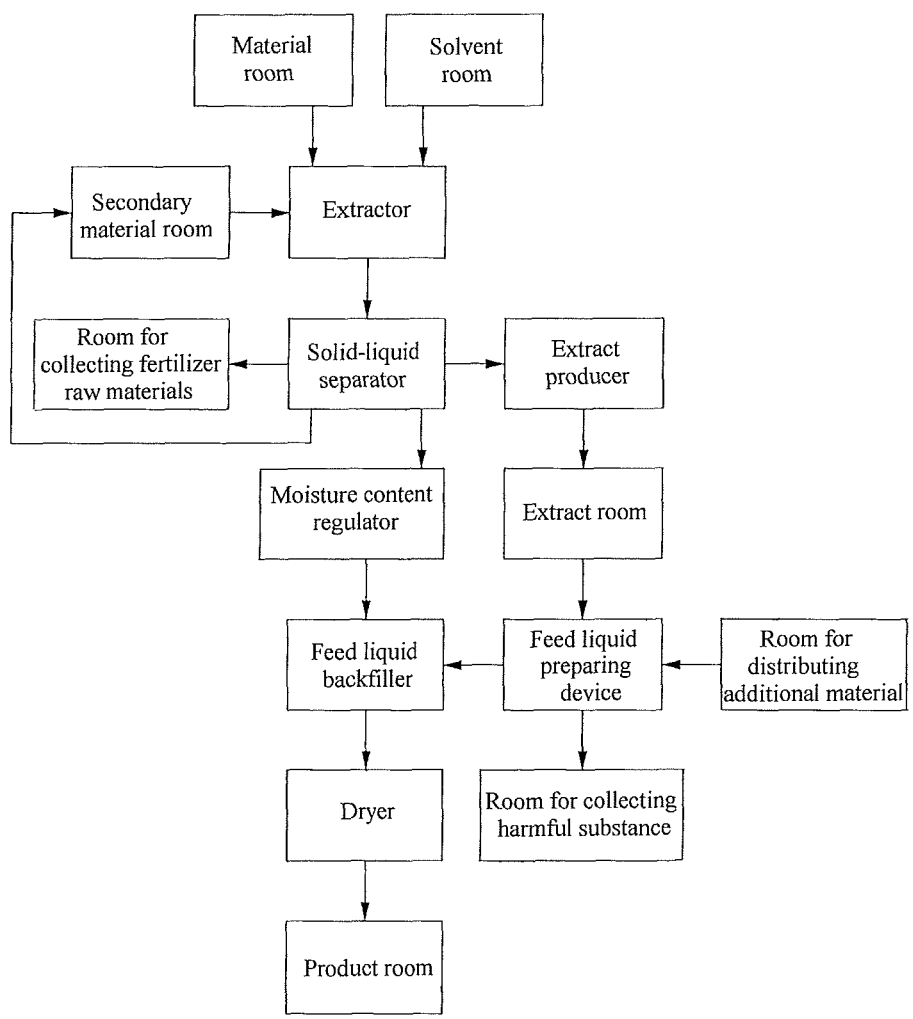
FIG. 1 is a block diagram which illustrates the flowchart of the apparatus according to one embodiment of the invention.

As shown in FIG. 1, an apparatus for the process for improving tobacco raw material in the first embodiment is a system composed of a plurality of interconnected independent devices comprising a material room, a solvent room, an extractor, a solid-liquid separator, a secondary material room, an extract producer, an extract room, a feed liquid preparing device, a room for collecting harmful substance, a room for distributing additional materials, a room for collecting fertilizer raw materials, a moisture content regulator, a feed liquid backfiller and a dryer, wherein the outlet of the material room and the liquid outlet of the solvent room are communicated with the inlet of the extractor, the outlet of the extractor is communicated with the inlet of the solid-liquid separator, the liquid outlet of the solid-liquid separator is communicated at one branch with the liquid inlet of the extract producer and at the other branch with the room for collecting fertilizer raw materials, the outlet of the extract producer is communicated with the inlet of the extract room, the outlet of the solid-liquid separator is communicated at one branch with the inlet of the secondary material room and at the other branch with the inlet of the moisture content regulator, the outlet of the secondary material room is communicated with the inlet of the extractor, the outlet of the moisture content regulator is communicated with the inlet of the feed liquid backfiller, the outlet of the extract room is communicated with the inlet of the feed liquid preparing device, the room for distributing additional material is communicated with the inlet of the feed liquid preparing device, the liquid outlet of the feed liquid preparing device is communicated with the liquid inlet of the feed liquid backfiller, the harmful substance outlet of the feed liquid preparing apparatus is communicated with the room for collecting harmful substance, the outlet of the feed liquid backfiller is communicated with the inlet of the dryer, and the outlet of the dryer is communicated with a production room.

The connection between two of the above independent devices may be provided with, as necessary, a conveyer belt, a spiral propeller, an infusion pump, a delivery pipe, a detector or a delivery metering controller, etc. The solid-liquid separator is a squeezing dryer. The feed liquid preparing apparatus is provided with a separator having an ultrafiltration membrane for the separation of the harmful components. The feed liquid backfiller is provided with stirring and squeezing mechanism. The solid-liquid separator and the feed liquid backfiller, at the connection portion of the outlet thereof, are provided with a loosening means for conducting loosening operation. The moisture content regulator uses a heating evaporator or a humidifier, etc. The room for distributing additional material is a metering distribution system for various additional materials.

Embodiment 2

A process for improving tobacco raw material according to an embodiment of the invention comprises conducting extraction from tobacco raw material used in cigarette industry by solvent, removing harmful components and backfilling with the feed liquid to obtain the improved tobacco raw material. The process specifically comprises the following steps:

1) Mixing tobacco leaves or flakes (tobacco raw material) with a mixed solvent containing 97% of purified water and 3% of propanediol at the mass ratio of 1:30 (tobacco raw material:solvent), and then conduct an extraction at a temperature of 50° C. for 80 minutes;

2) Conducting a solid-liquid separation for the tobacco raw material after extraction by means of centrifugation until the dryness of the tobacco raw material reaches 40%;

3) Using the extract liquor after the solid-liquid separation of the tobacco leaf or flake for preparing an extract of natural tobacco that can be used in this process;

4) Preparing a backfilling feed liquid by the following steps: firstly, diluting with purified water 5 parts by mass of aqueous extract of natural tobacco prepared by the extract liquor in the present process and 1 part by mass of the alcohol extract of natural tobacco prepared by an extract liquor obtained from other process, mixing them uniformly, and then removing the harmful components by using a combination of a nanofiltration membrane with a cut-off molecular-weight of 2000 Dalton and an ultrafiltration membrane with a cut-off molecular-weight of 50000 Dalton, and subsequently adding humectant or other functional agents allowed to be added in the tobacco production so as to obtain the backfilling feed liquid with a concentration thereof being controlled by 40%;

5) Adjusting the dryness of the tobacco raw material after the solid-liquid separation to 60%, and then backfilling uniformly the backfilling feed liquid into the tobacco raw material after solid-liquid separation by means of immersion, in which the mass ratio of the backfilling is 120%.

6) Pre-drying by microwave the tobacco raw material after backfilling until the dryness of the tobacco raw material reaches 60%, followed by reducing the moisture to 13% by inflation process, thus obtaining the end product.

Figure 2:
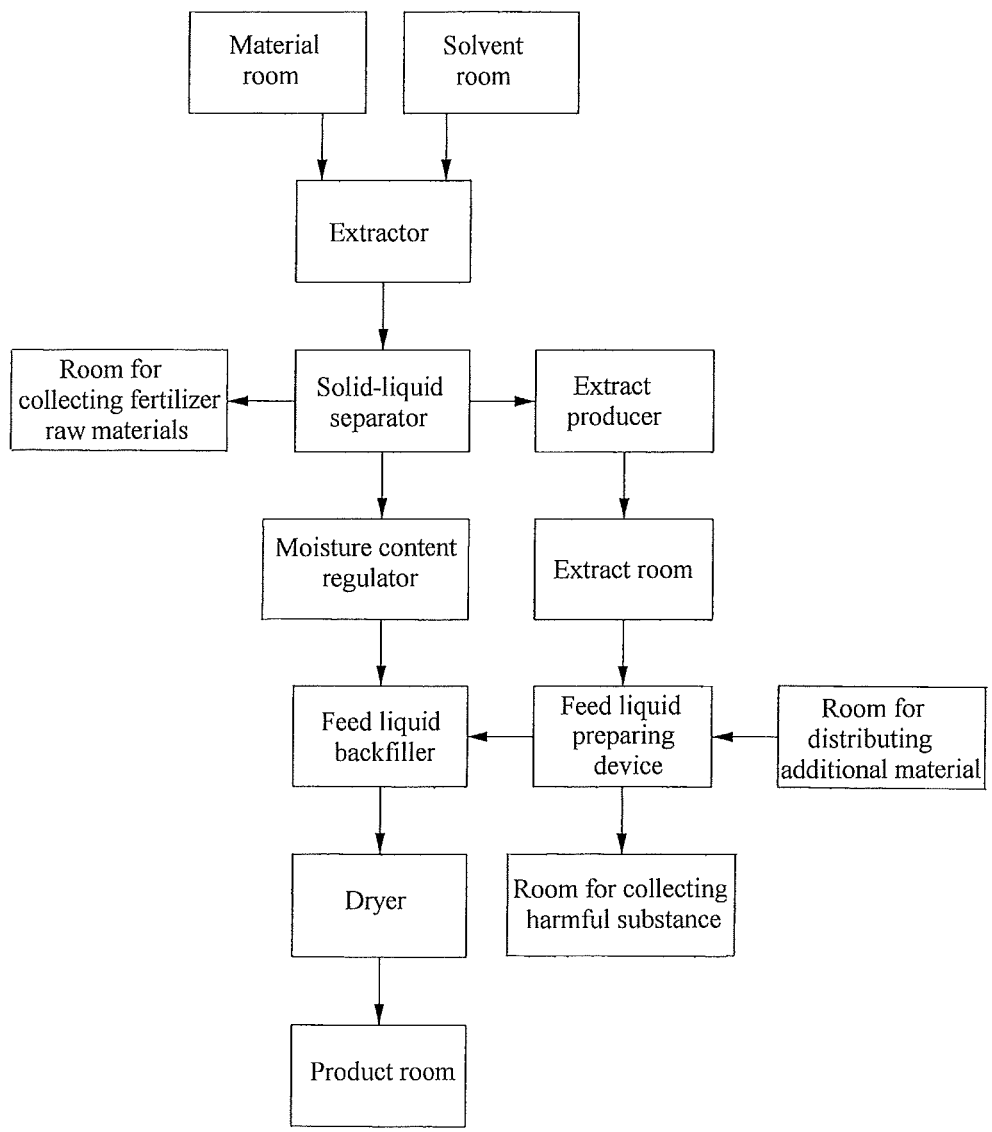
FIG. 2 is a block diagram which illustrates the flowchart of the apparatus according to another embodiment of the invention.

As shown in FIG. 2, an apparatus for the process for improving tobacco raw material in the second embodiment is a system composed of a plurality of interconnected independent devices comprising a material room, a solvent room, an extractor, a solid-liquid separator, an extract producer, an extract room, a feed liquid preparing device, a room for collecting harmful substance, a room for distributing additional material, a room for collecting fertilizer raw materials, a moisture content regulator, a feed liquid backfiller and a dryer, wherein the outlet of the material room and the liquid outlet of the solvent room are communicated with the inlet of the extractor, the outlet of the extractor is communicated with the inlet of the solid-liquid separator, the liquid outlet of the solid-liquid separator is communicated at one branch with the liquid inlet of the extract producer and at the other branch with the room for collecting fertilizer raw materials, the outlet of the extract producer is communicated with the inlet of the extract room, the outlet of the solid-liquid separator is communicated at one branch with the inlet of the secondary material room and at the other branch with the inlet of the moisture content regulator, the outlet of the secondary material room is communicated with the inlet of the extractor, the outlet of the moisture content regulator is communicated with the inlet of the feed liquid backfiller, the outlet of the extract room is communicated with the inlet of the feed liquid preparing device, the room for distributing additional material is communicated with the inlet of the feed liquid preparing device, the liquid outlet of the feed liquid preparing device is communicated with the liquid inlet of the feed liquid backfiller, the harmful substance outlet of the feed liquid preparing apparatus is communicated with the room for collecting harmful substance, the outlet of the feed liquid backfiller is communicated with the inlet of the dryer, and the outlet of the dryer is communicated with a production room.

The connection between two independent devices may be provided with, as necessary, a conveyer belt, a spiral propeller, an infusion pump, a delivery pipe, a detector or a delivery metering controller, etc. The solid-liquid separator is a centrifugal machine. The feed liquid preparing apparatus is provided with a separator having an ultrafiltration membrane for the separation of the harmful components. The moisture content regulator uses a heating evaporator or a humidifier etc. The room for distributing additional material is a metering distribution system for various additional materials.

Embodiment 3

A process for improving tobacco raw material according to a further embodiment of the invention comprises conducting extraction from tobacco raw material used in cigarette industry by solvent, removing harmful components and backfilling with the feed liquid to obtain the improved tobacco raw material. The process specifically comprises the following steps:

1) Mixing cut tobacco (tobacco raw material) with a mixed solvent containing 80% of purified water and 20% of ethanol at a mass ratio of 1:17 (tobacco raw material: solvent), and then conduct an extraction at a temperature of 10° C. for 120 minutes;

2) Conducting a solid-liquid separation for the tobacco raw material after extraction by means of centrifugation until the dryness of tobacco raw material reaches 60%;

3) Using the extract liquor after the solid-liquid separation of the cut tobacco for preparing an extract of natural tobacco that can be used in this process;

4) Preparing a backfilling feed liquid by the following steps: firstly, diluting with purified water 1 part by mass of aqueous extract of natural tobacco prepared by the extract liquor in the present process and 0.1 part by mass of the alcohol extract of natural tobacco prepared by an extract liquor obtained from other process, mixing them uniformly, and then removing the harmful components by using a combination of a nanofiltration membrane with a cut-off molecular-weight of 2000 Dalton and an ultrafiltration membrane with a cut-off molecular-weight of 100000 Dalton, and subsequently adding humectant or other functional agents allowed to be added in the tobacco production so as to obtain the backfilling feed liquid with a concentration thereof being controlled by 30%;

5) Adjusting the dryness of the tobacco raw material after the solid-liquid separation to 40%, then backfilling uniformly the backfilling feed liquid into the tobacco raw material after solid-liquid separation by means of immersion, in which the mass ratio of the backfilling is 80%.

6) Pre-drying by microwave the tobacco raw material after backfilling until the dryness of the tobacco raw material reaches 60%, followed by reducing the moisture to 12% by inflation process, thus obtaining the end product.

As shown in FIG. 1, an apparatus for the process for improving tobacco raw material in the third embodiment is a system composed of a plurality of interconnected independent devices comprising a material room, a solvent room, an extractor, a solid-liquid separator, an extract producer, an extract room, a feed liquid preparing device, a room for collecting harmful substance, a room for distributing additional material, a room for collecting fertilizer raw materials, a moisture content regulator, a feed liquid backfiller and a dryer, wherein the outlet of the material room and the liquid outlet of the solvent room are communicated with the inlet of the extractor, the outlet of the extractor is communicated with the inlet of the solid-liquid separator, the liquid outlet of the solid-liquid separator is communicated at one branch with the liquid inlet of the extract producer and at the other branch with the room for collecting fertilizer raw materials, the outlet of the extract producer is communicated with the inlet of the extract room, the outlet of the solid-liquid separator is communicated at one branch with the inlet of the secondary material room and at the other branch with the inlet of the moisture content regulator, the outlet of the secondary material room is communicated with the inlet of the extractor, the outlet of the moisture content regulator is communicated with the inlet of the feed liquid backfiller, the outlet of the extract room is communicated with the inlet of the feed liquid preparing device, the room for distributing additional material is communicated with the inlet of the feed liquid preparing device, the liquid outlet of the feed liquid preparing device is communicated with the liquid inlet of the feed liquid backfiller, the harmful substance outlet of the feed liquid preparing apparatus is communicated with the room for collecting harmful substance, the outlet of the feed liquid backfiller is communicated with the inlet of the dryer, and the outlet of the dryer is communicated with a production room.

The connection between two of the above independent devices may be provided with, as necessary, a conveyer belt, a spiral propeller, an infusion pump, a delivery pipe, a detector or a delivery metering controller, etc. The solid-liquid separator is a centrifugal machine. The feed liquid preparing device is provided with a separator having an ultrafiltration membrane for the separation of the harmful components. The moisture content regulator uses a heating evaporator or a humidifier etc. The room for distributing additional material is a metering distribution system for various additional materials.

The invention claimed is:

1. A system for improving tobacco raw material comprising the following components:
   a) a materials room;
   b) a solvent room;
   c) an extractor;
   d) a solid-liquid separator;
   e) an extract producer;
   f) an extract room;
   g) a feed liquid preparing device;
   h) a room for collecting harmful substances;
   i) a room for distributing additional material;
   j) a room for collecting fertilizer raw materials;
   k) a moisture content regulator;
   l) a feed liquid backfiller;
   m) a dryer; and
   n) a secondary materials room;
   wherein each of the components a) through n) is an independent component; and wherein the independent components are interconnected to each other as follows:
   an outlet of the materials room and a liquid outlet of the solvent room are in communication with an inlet of the extractor;
   an outlet of the extractor is in communication with an inlet of the solid-liquid separator;
   a liquid outlet of the solid-liquid separator has a first branch and a second branch and the first branch is in communication with a liquid inlet of the extract producer and the second branch is in communication with the room for collecting fertilizer raw materials;
   an outlet of the extract producer is in communication with an inlet of the extract room;
   a solid outlet of the solid-liquid separator has a first branch and a second branch, and the first branch of the solid outlet of the solid-liquid separator is in communication with an inlet of the secondary materials room, the second branch of the solid outlet of the solid-liquid separator is in communication with an inlet of the moisture content regulator;
   an outlet of the moisture content regulator is in communication with a solid inlet of the feed liquid backfiller;
   an outlet of the extract room is in communication with an extract inlet of the feed liquid preparing device;
   the room for distributing additional material is in communication with an additional material inlet of the feed liquid preparing device;
   a liquid outlet of the feed liquid preparing device is in communication with a liquid inlet of the feed liquid backfiller;
   a harmful substance outlet of the feed liquid preparing device is in communication with the room for collecting harmful substance;
   an outlet of the feed liquid backfiller is in communication with an inlet of the dryer, and
   an outlet of the dryer is in communication with a product room.

2. The system according to claim 1, wherein an outlet of the secondary materials room is in communication with the inlet of the extractor; and wherein a step of extraction occurs in the extractor and a step of solid-liquid separation occurs in the solid-liquid separator; and wherein the steps of extraction and solid-liquid separation occur two or more times.

3. The system according to claim 1, further comprising a conveyer belt, a spiral propeller, an infusion pump, a delivery pipe, a detector or a delivery metering controller provided at a connection between a first one of the independent components a) through n) and a second one of the independent components a) through n).

4. The system according to claim 1, wherein the feed liquid preparing device is provided with a nanofiltration membrane separator or an ultrafiltration membrane separator or a column separator for removal of harmful substances.

5. The system according to claim 4, wherein the feed liquid preparing device is provided with the nanofiltration membrane separator or the ultrafiltration membrane and wherein the nanofiltration membrane separator or the ultrafiltration membrane is selected for a cut-off molecular-weight of from about 3000 Daltons up to about 100000 Daltons.

6. The system according to claim 1, wherein the feed liquid backfiller is provided with a stirring mechanism or with a squeezing mechanism.

7. The system according to claim 1, wherein the solid outlet of the solid-liquid separator or the outlet of the feed liquid backfiller is provided with a mechanism for scattering materials.

8. The system according to claim 1, wherein the solid-liquid separator is provided with a squeezing mechanism.

9. The system according to claim 1, wherein solid-liquid separator includes a centrifugal dryer or a squeezing dryer.

10. The system according to claim 1, wherein the moisture content regulator is a heating evaporator or a humidifier.

11. The system according to claim 1, wherein the dryer further includes a microwave that is adapted to pre-dry tobacco raw material.

12. The system according to claim 1, further comprising a switch at the liquid outlet of the solid-liquid separator that connects to the liquid inlet of the extract producer.

13. The system according to claim 1, further comprising a switch provided at the liquid outlet of the solid-liquid separator that connects to the liquid inlet of the room for collecting fertilizer raw materials.

* * * * *